US00RE41964E

(19) United States
(12) Reissued Patent
Hellrung et al.

(10) Patent Number: US RE41,964 E
(45) Date of Reissued Patent: Nov. 30, 2010

(54) SEAT RECLINER AND FLOOR LATCH WITH INTERLOCK

(75) Inventors: Jacob Paul Hellrung, Grosse Pointe Farms, MI (US); Christopher James Ryan, Fraser, MI (US)

(73) Assignee: Fisher & Company, Incorporated, St. Clair Shores, MI (US)

(21) Appl. No.: 11/804,408

(22) Filed: May 17, 2007

Related U.S. Patent Documents

Reissue of:
(64) Patent No.: 6,345,867
Issued: Feb. 12, 2002
Appl. No.: 09/586,366
Filed: Jun. 2, 2000

(51) Int. Cl.
*B60N 2/04* (2006.01)
*B60N 2/20* (2006.01)

(52) U.S. Cl. ..... 297/336; 297/378.12; 296/65.03
(58) Field of Classification Search ..... 297/378.12, 297/378.13, 336; 296/65.01, 65.03
See application file for complete search history.

(56) References Cited

U.S. PATENT DOCUMENTS

| | | | | |
|---|---|---|---|---|
| 2,983,545 | A | | 5/1961 | Garvey et al. |
| 3,880,464 | A | | 4/1975 | Murphy et al. |
| 4,434,468 | A | | 2/1984 | Caddick et al. |
| 4,467,252 | A | | 8/1984 | Takeda et al. |
| 4,484,776 | A | | 11/1984 | Gokimoto et al. |
| 4,606,577 | A | | 8/1986 | Hirama et al. |
| 4,627,656 | A | | 12/1986 | Gokimoto et al. |
| 4,747,641 | A | * | 5/1988 | Bell |
| 4,813,721 | A | | 3/1989 | Mora |
| 5,004,967 | A | | 4/1991 | Ogasawara |
| 5,393,116 | A | | 2/1995 | Bolsworth et al. |
| 5,435,624 | A | | 7/1995 | Bray et al. |
| 5,536,069 | A | | 7/1996 | Bray et al. |
| 5,577,805 | A | | 11/1996 | Glinter et al. ..... 297/378.12 |
| 5,662,368 | A | | 9/1997 | Ito et al. |
| 5,717,300 | A | | 2/1998 | Baloche et al. |
| 5,751,129 | A | | 5/1998 | Vergin |
| 5,941,591 | A | | 8/1999 | Tsuge et al. |
| 6,079,763 | A | | 6/2000 | Clemente |
| 6,123,380 | A | | 9/2000 | Sturt et al. |
| 6,131,999 | A | | 10/2000 | Piekny et al. |
| 6,135,555 | A | | 10/2000 | Liu et al. |
| 6,139,104 | A | | 10/2000 | Brewer |
| 6,158,800 | A | | 12/2000 | Tsuge et al. |
| 6,174,017 | B1 | | 1/2001 | Salani et al. |
| 6,270,141 | B2 | | 8/2001 | Moon et al. |
| 6,290,297 | B1 | | 9/2001 | Yu |
| 6,300,732 | B1 | | 10/2001 | Brambilla |
| 6,345,867 | B1 | | 2/2002 | Hellrung et al. |
| 6,361,098 | B1 | | 3/2002 | Pesta et al. |
| 6,478,358 | B1 | | 11/2002 | Okazaki et al. |
| 6,523,899 | B1 | | 2/2003 | Tame |
| 6,644,730 | B2 | | 11/2003 | Sugiura et al. |

(Continued)

FOREIGN PATENT DOCUMENTS

DE 40 34 561 A1 5/1992

*Primary Examiner*—Anthony D Barfield
(74) *Attorney, Agent, or Firm*—Harness, Dickey & Pierce, P.L.C.

(57) ABSTRACT

A latch system for providing adjustment of a seat back relative to a seat bottom includes a seat-back latch mechanism interconnecting the seat back and the seat bottom for movement of the seat back between a use position and a folded position and a floor-latch mechanism selectively connecting the seat bottom to the base for movement of the seat bottom between a deployed position and a stowed position. An interlock mechanism interacts with the floor-latch mechanism and the seat-back latch mechanism to selectively block operation of the floor-latch mechanism and the seat-back latch mechanism.

14 Claims, 6 Drawing Sheets

U.S. PATENT DOCUMENTS

| | | | |
|---|---|---|---|
| 6,677,720 | B2 | 1/2004 | Fraser |
| 6,698,837 | B2 | 3/2004 | Pejathaya et al. |
| 6,794,841 | B1 | 9/2004 | Vang et al. |
| 6,857,703 | B2 | 2/2005 | Bonk |
| 6,860,562 | B2 | 3/2005 | Bonk |
| 6,910,739 | B2 | 6/2005 | Grable et al. |
| 6,923,504 | B1 | 8/2005 | Liu et al. |
| 2005/0006939 | A1 | 1/2005 | Hancock et al. |

* cited by examiner

SEAT RECLINER AND FLOOR LATCH WITH INTERLOCK

Matter enclosed in heavy brackets [ ] appears in the original patent but forms no part of this reissue specification; matter printed in italics indicates the additions made by reissue.

FIELD OF THE INVENTION

The present invention relates generally to vehicle scat assembly and, more particularly, to a seat latch system operable to adjustably recline the seat back, selectively lock the seat back in an upright position and a folded position, and place the vehicle seat in stowed and deployed positions, with an interlock mechanism interconnecting a seat-back latch mechanism and floor-latch mechanism to ensure a predetermined sequence of latch operation.

BACKGROUND OF THE INVENTION

Seat assemblies of the type used in motor vehicles are commonly equipped with locking pivot mechanisms that can be selectively actuated to permit angular adjusting of the seat back relative to the seat bottom, thereby providing added comfort and convenience to the seat occupant. Typically, these locking mechanisms include a housing fixed to the seat bottom, a quadrant fixed to the seat back and supported from the housing for pivotal movement about a first pivot point, a lock pawl supported from the housing for pivotal movement about a second pivot point, and a release actuator for causing movement of the lock pawl between first and second positions. In its first position, teeth in the lock pawl engage teeth on the quadrant for preventing movement of the quadrant about the first pivot point, thereby releasably locking the seat back in a desired position. In contrast, movement of the lock pawl to its second position causes the teeth to disengage the teeth in the quadrant and permit angular movement of the seat back to a desired position. Typically, the release actuator includes a spring-biased cam for normally locating the locking pawl in its first position. In many seating applications, this type of locking mechanism is used as a seat recliner to permit selective adjustment of the seat back between an upright position and a fully reclined position.

Recently, however, with the increased popularity of pickup trucks, mini-vans, and sport utility vehicles, there has been an interest in developing seat assemblies in which the seat back is capable of folding forward to a dumped position for providing improved accessibility to storage space or for providing increased cargo area. In pick-up trucks, the ability to fold the front seat backs completely forward permits access to the rearward cab compartment. In mini-vans and sport utility vehicles, the ability to fold the rear seat backs completely forward enables the cargo space to be increased or ingress to be simplified. In known designs, the seat assembly is equipped with a seat-back dump mechanism that typically employs some variation of a pawl-type blocking pivot mechanism. Although pawl-type pivot mechanisms enable a seat back to be reclined to a substantially flat position, they may not enable the seat back to be folded completely forward to improve accessibility to storage space or provide an increased cargo area. Furthermore, vehicle seats must be capable of withstanding extreme forward and rearward forces that result from belt loading caused during a collision. In pawl-type pivot mechanisms, these forces are transmitted to the pawl and the quadrant. As such, the cam must be designed to withstand these extreme forces, thereby increasing the complexity and cost of the seat-back dump mechanism.

Consistent with this focus, there is an interest in developing seat assemblies that are moveable between stowed and deployed positions to improve accessibility to storage space and rearward seating areas or to provide increased cargo area. The stowable seats oftentimes include a latch mechanism that is operable to releasably connect a portion of the seat to the vehicle floor, thereby allowing the seat to be tilted between its deployed and the slowed positions. While existing mechanisms are generally effective at performing this intended function, they may present safety problems. It is essential to ensure that a vehicle seat occupant is not confused as to whether the floor latch is fully engaged before occupying the vehicle seat. Prior designs do not block motion of the seat to a stowed position while the seat back is in an upright or use position, as well as block motion of the seat from the dump position to the upright or use position until the floor latch is fully engaged. Thai is, such prior designs do not ensure that the seat is not able to pivot when the seat back is locked and that the seat back is not able to pivot when the floor latch is not fully engaged.

Current seat designs sometimes include latch mechanisms that require that the occupant manipulate the respective latches in a specific sequence to ensure proper positioning of the seat in its deployed and stowed positions. Toward this end, seats have included interlock devices for ensuring proper sequencing. While existing interlock mechanisms are generally effective at performing this function, they do not provide necessary safety features, or a consistency of operation, in a cost-effective and simplified interlock arrangement.

SUMMARY OF THE INVENTION

A seat assembly according to the invention includes a cost-effective and simple interlock arrangement for ensuring proper sequencing of seat latch operation, whereby a safe seat design is provided. The seat assembly generally includes a seat bottom pivotally mounted to a base at a front portion and releasably mounted to the base at a rear portion, as well as a seat back angularly adjustable relative to the seat bottom. A seat-back latch mechanism interconnects the seat back and the se at bottom for pivotal movement between a use position and a folded position. A floor-latch mechanism releasably mounts the seat bottom to the base for pivotal movement between a deployed position and a stowed position. An interlock mechanism interacts with the floor-latch mechanism and the seat-back latch mechanism to ensuring proper sequencing of latch operation. The interlock mechanism includes a lock-out lever to selectively block operation of the floor-latch mechanism and the seat-back latch mechanism. The lock-out lever includes a segment blocking the floor lock latch mechanism when the seat back is in the upright position and a segment blocking the seat-back latch mechanism when said seat bottom is in the stowed position.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
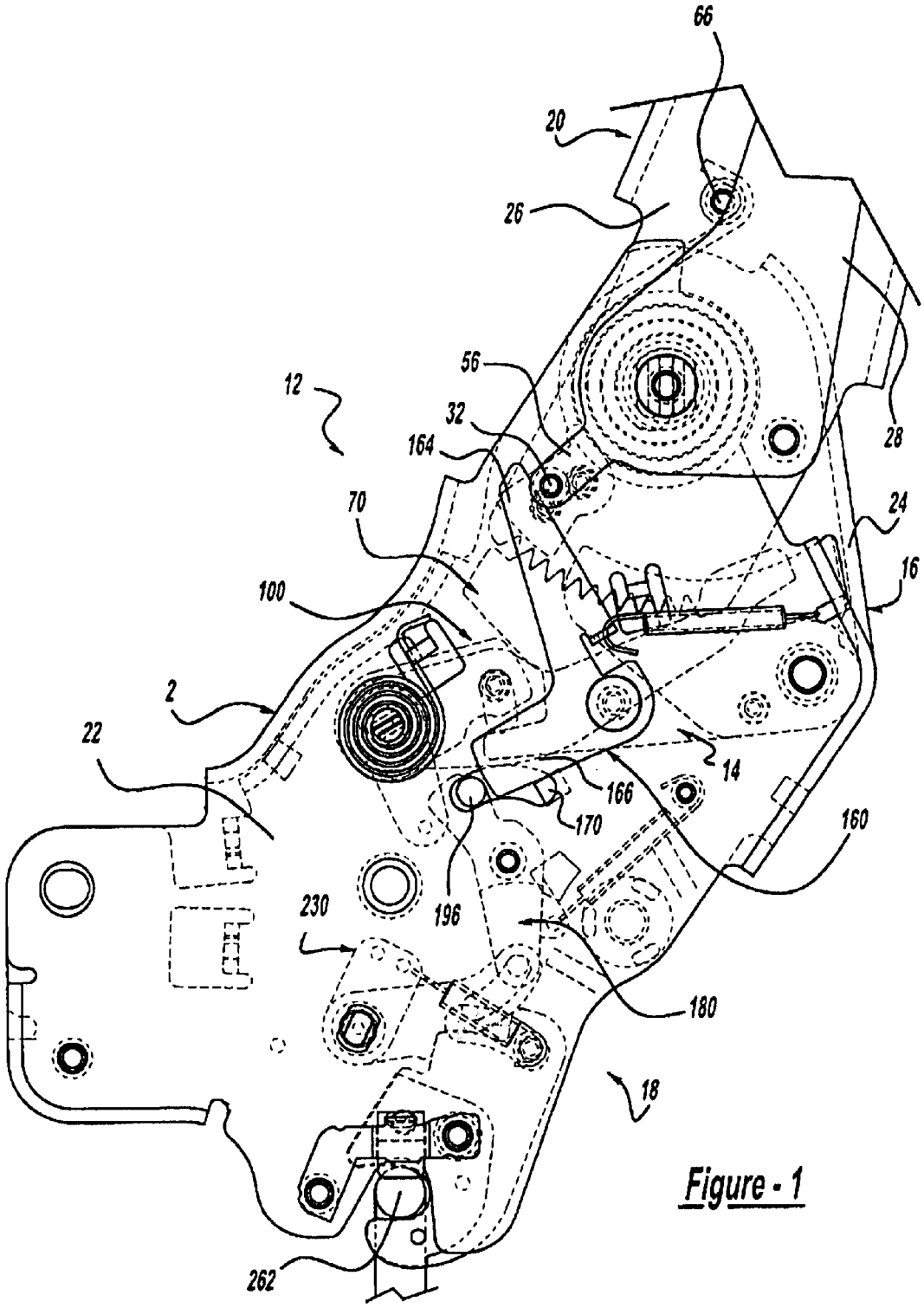
FIG. 1 is a side view, with portions shown in phantom, of a latch system equipped with an interlocking recliner and latch assembly in position to place a seat back in an upright, locked position.

Referring to the drawings, a vehicle seat assembly 10 incorporating a latch system 12 in accordance with the present invention is shown including a housing 2 in a seat bottom 6 and a quadrant 20 in a seat back 8. In particular, the latch system 12 includes a seat-back latch mechanism 16 interconnecting the quadrant 20 and housing 2, a floor-latch mechanism 18 selectively connecting the housing 2 to a base 4, and an interlocking mechanism 14 for interconnecting the latch mechanisms 16, 18. The seat-back latch mechanism 16 is a locking pivot mechanism operable to support the seat back 8 for selective pivotal movement relative to a seat bottom 6 between a first or "upright" position and a second or "folded" position. The floor-latch mechanism 18 is a locking hook mechanism operable to support the seat bottom 6 for selective pivotable movement between a first or "deployed" position and a second or "stowed" position. The seat assembly 10 is mounted to the base 4, such as the floor or fender well of a vehicle, the frame structure of a bench-type seat, the seat pan in a stand-alone seat assembly, or any other equivalent vehicle-mounted support structure to which a seat bottom is fixed. Thus, the seat assembly 10 is exemplary of the type conventionally used as a front seat in pickup trucks or the second and third row seats in sport-utility vehicles in minivans.

Figure 2:
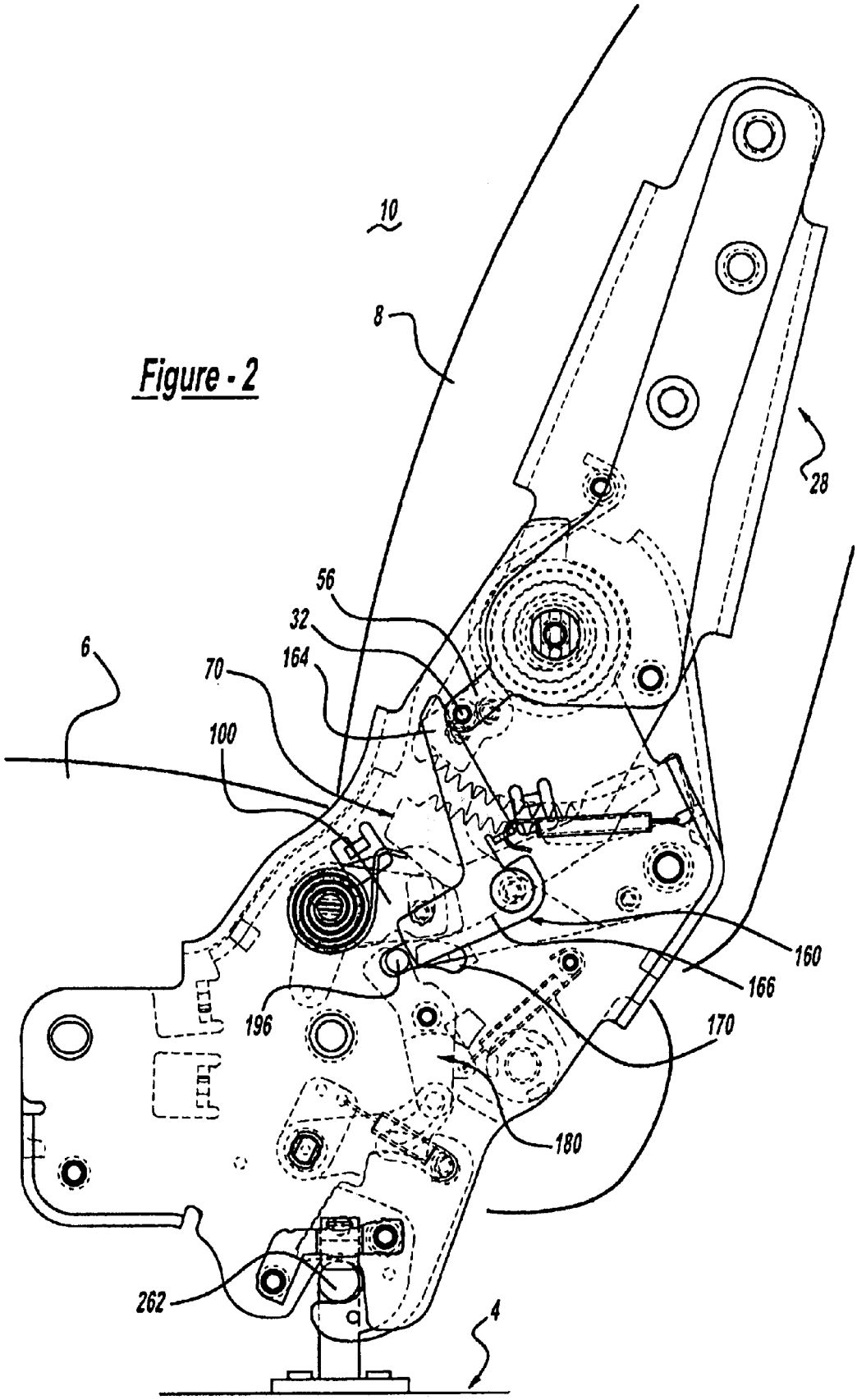
FIG. 2 is a side view of a vehicle seat assembly, including the latch system of FIG. 1, with the seat back in an upright, unlocked position.
Figure 3:
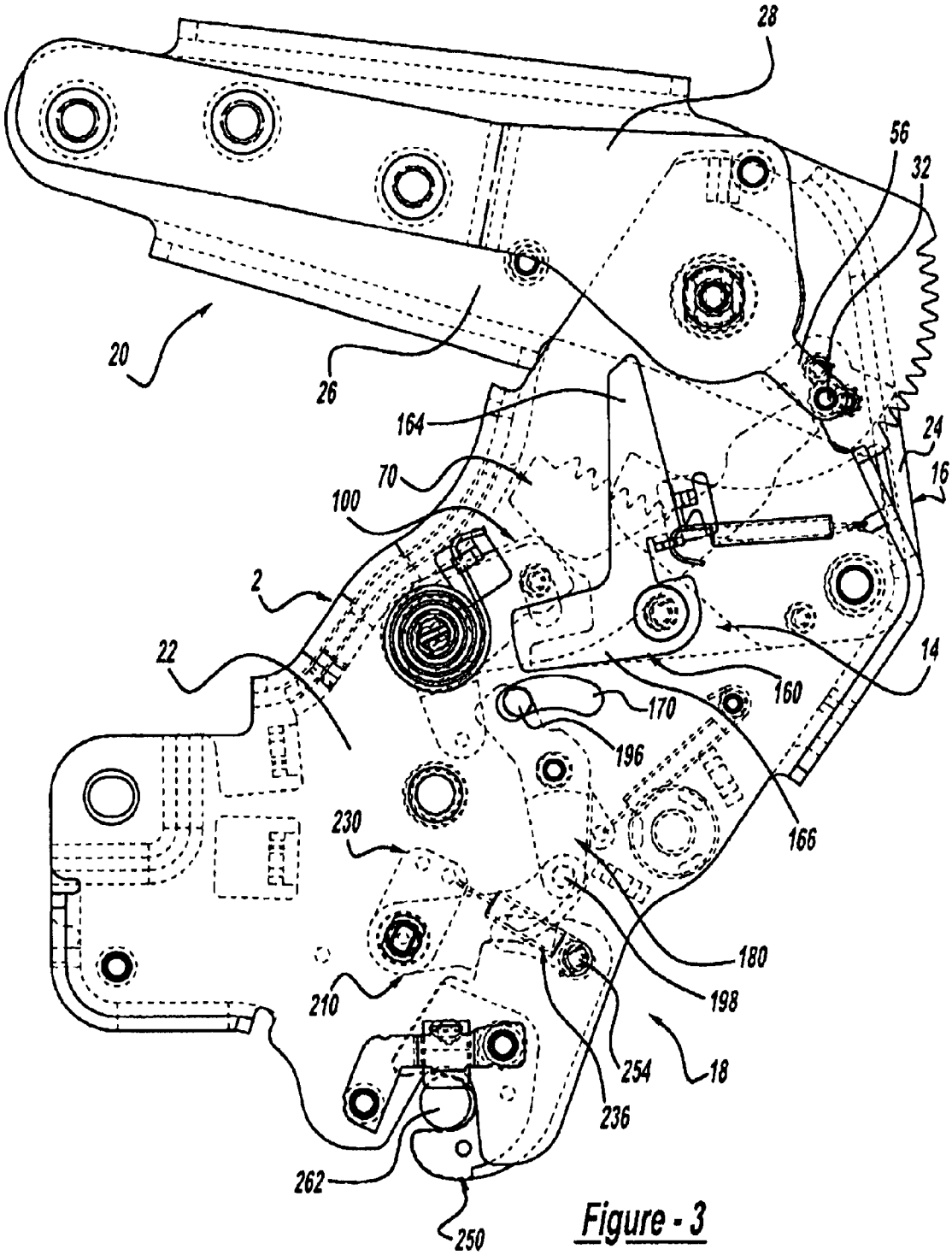
FIG. 3 is a side view of the latch system of FIG. 1 in position to place the seat back in a folded position.
Figure 6:
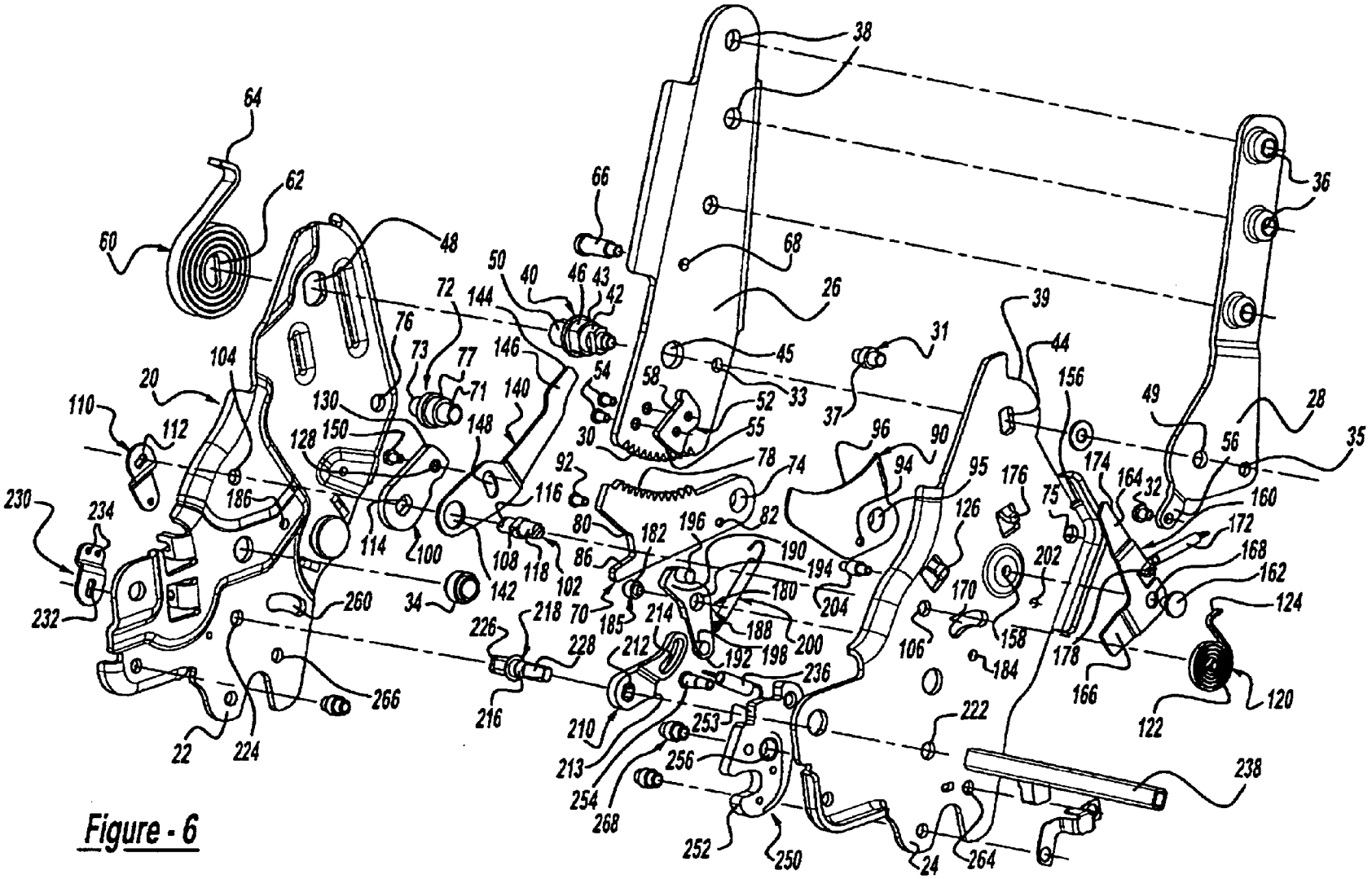
FIG. 6 is an exploded perspective view of the interlocking recliner and latch assembly of FIGS. 1–3.

The seat-back latch mechanism 16 is normally operable for latching the seat back 8 in a desired use position; i.e., the upright position, as shown in FIG. 1. The seat-back latch mechanism 16 is further operable to permit the seat back 8 to be released for movement from its upright position to a generally horizontal position; i.e., the folded position, relative to the seat bottom 6, as shown in FIG. 3. Further, the seat-back latch mechanism 16 is operable to adjust the recline of the seat back 8 relative the seat bottom 6 in the use position. As illustrated in FIGS. 1, 2 and 6, the seat-back latch mechanism 16 generally includes a seat-back latch release lever 110 rotatably interconnected to a cam 100, which selectively actuates a pawl 70; a quadrant carrier plate 90 connected to the pawl 70 for supporting rotation of the seat back 8; and a fold-hold plate 140 interconnected to the cam 100 for selectively blocking movement of the quadrant 20, and thus the seat back 8, to the upright position.

Figure 5:
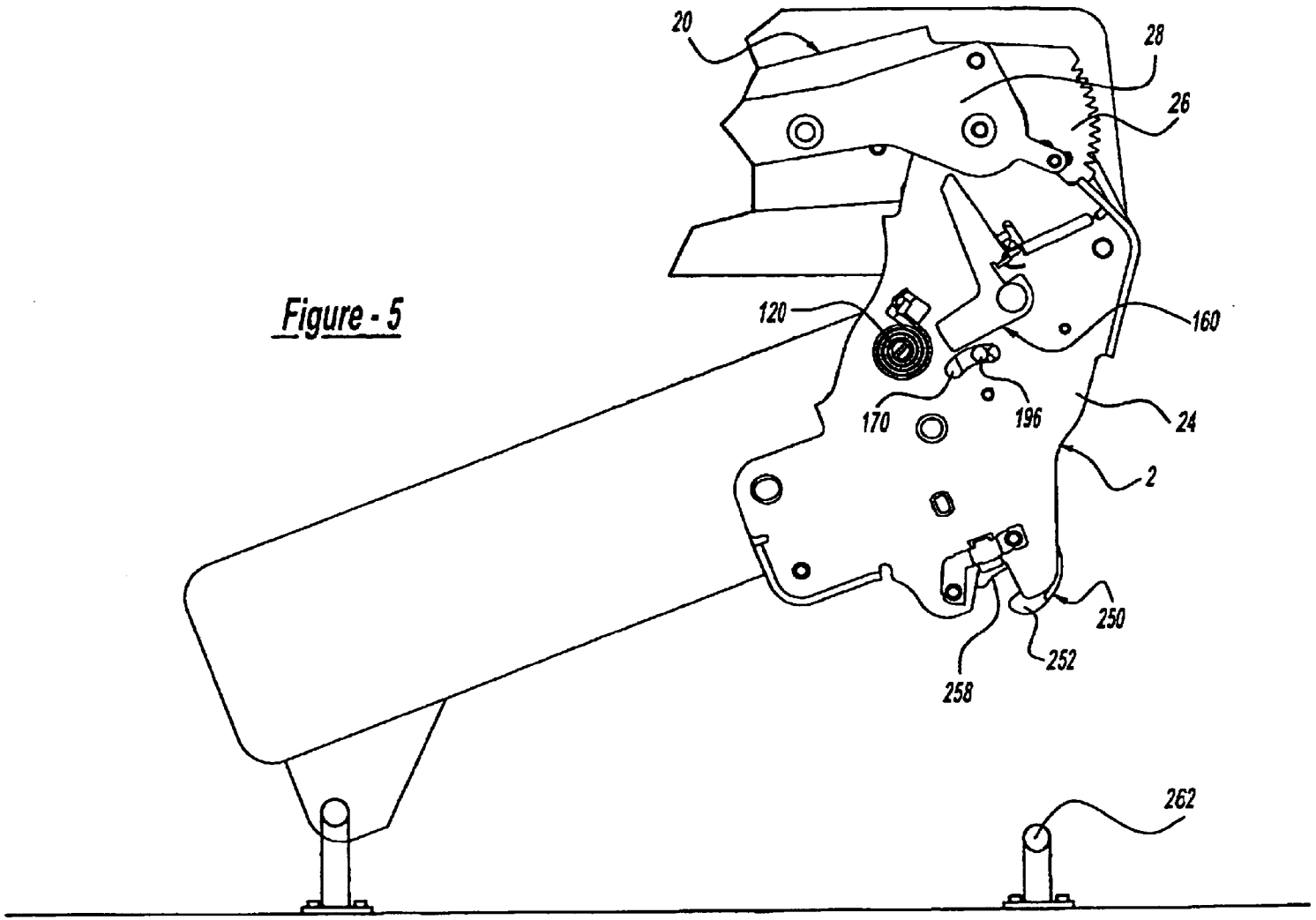
FIG. 5 is a side view of the latch system of FIG. 1 with the vehicle seat in the stowed position.

The floor-latch mechanism 18 is normally operable for latching the seat bottom 6 in a desired use position; i.e., the deployed position, as shown in FIG. 1. The floor-latch mechanism 18 is further operable to permit the seat bottom 6 to be released for movement from its deployed position toward a generally vertical position; i.e., the stowed position, relative the base 4, as illustrated in FIG. 5. As shown, the seat bottom 6 is pivotally mounted to the base 4 adjacent a from portion of the seat bottom 6 opposite the floor-latch mechanism 18. The floor-latch mechanism 18 generally includes a floor-latch release lever 230 rotatably interconnected to a cam latch 210 and interconnected to a claw plate 250. By selectively blocking rotation of the cam latch 210, the floor-latch release lever 230 and the claw plate 250 are locked in the use position.

The interlock mechanism 14 is operable to permit operation of the seat-back latch mechanism 16 and block operation of the floor-latch mechanism 18. The interlock mechanism 14 is further operable to permit operation of the floor-latch mechanism 18 and block operation of the seat-back latch mechanism 16. The interlock mechanism 14 generally includes first and second lock-out levers 160, 180 operable to rotate between first and second positions. In the first position, as shown in FIG. 1, the first lock-out lever 160 blocks operation of the floor-latch mechanism 18 by blocking rotation of the second lockout lever 180, which blocks rotation of the cam latch 210 and the floor-latch release lever 230. In the second position, as shown in FIG. 3, the first lock-out lever 160 no longer blocks operation of the floor-latch mechanism 18, whereby the floor-latch mechanism 18 is operable.

The seat-back latch mechanism 16 interconnects the quadrant 20 to the housing 2. As shown in FIG. 6, the housing 2 includes outboard and inboard base plates 22, 24 for supporting the seat bottom 6. The quadrant 20 includes outboard and inboard support plates 26, 28 for supporting the seat back 8. As shown in FIG. 1, the outboard support plate 26 is disposed between the outboard base plate 22 and the inboard base plate 24, and the inboard support plate 28 is disposed on the inboard side of the inboard base plate 24.

A pivot pin 40 pivotally mounts the outboard and inboard support plates 26, 28 to the outboard and inboard plates 22, 24 of the quadrant 20. The pivot pin 40 includes a keyed shoulder 42 for reception in a keyed aperture 44 of inboard base plate 24 and a keyed shoulder 46 for reception in a keyed aperture 48 of outboard base plate 22. A bearing surface 43 between keyed shoulders 42, 46 supports the outboard support plate 26 through aperture 45 therethrough. A slotted end 50 of the pivot pin 40 receives an inner end 62 of a main spring 60. An outer end 64 of the main spring 60 is connected to the outboard support plate 26 via a rivet 66 mounted in an aperture 68 of the plate 26. The support plates 26, 28 are biased to their generally horizontal or dumped position by the main spring 60. An end 47 of the pivot pin 40 opposite the slotted end 50 is received through an aperture 49 in the inboard support plate 28 to rotatably support the plate 28.

The outboard base plate 22 is secured to the inboard base plate 24 and one or more barrels 34 properly space the inboard base plate 24 from the outboard base plate 22. Fasteners (not shown) are preferably used to secure the base plates 22, 24 together. The support plates 26, 28 are secured together by fasteners (not shown) received through multiple aligned apertures 36, 38, respectively, which also serve to mount the seat back 8 to the support plates. When assembled, outboard support plate 26 and inboard support plate 28 flank the inboard base plate 24 of the quadrant 20.

The outboard support plate 26 includes teeth 30 at its lowermost end, and a lock plate 52 adjacent to the teeth 30 and secured to the support plate 26 by fasteners 54. The block-like lock plate 52 includes a lock surface 58 disposed generally perpendicular to a camming surface 55. The inboard support plate 28 includes a projection 56 extending angularly from a lower portion thereof to support a lock-out pin 32, which is disposed generally transverse to the projection 56. A stop rivet 31 is mounted in apertures 33, 35 of the outboard and inboard support plates 26, 28, respectively, to support rotation of the quadrant 20 relative the housing 2. The stop rivet 31 includes a bearing surface 37 that stops along the arcuate surface 39 of the base plate 24.

The pawl 70 is a pivotally mounted plate having pawl teeth 78, a cam surface 80, and a projection 86. The pawl 70 is pivotally supported by the outboard and inboard base plates 22, 24 via a pawl pivot 72 received through an aperture 74 of the pawl 70, an aperture 76 of the outboard plate 22, and an aperture 75 of the inboard plate 24. The pawl teeth 78 are disposed along an arcuate upper edge of the pawl 70 for selective engagement with the teeth 30 of the inboard support plate 26. A generally tetrahedral-shaped notch from an end of the pawl 70 opposite its pivotal connection to the pivot 72 defines the cam surface 80 along an angular leg thereof, and a projection 86 generally opposing the cam surface 80. The pawl pivot 72 includes opposite ends 71, 73 journalled in the apertures 75, 76 of the base plates 24, 22, and an intermediate bearing surface 77 for rotatably supporting the pawl 70 and the quadrant carrier 90.

The quadrant carrier 90 is a pivotally mounted plate fixed for rotation with the pawl 70 and including an arcuate guide surface 96 for supporting the quadrant 20. The quadrant carrier 90 is disposed adjacent the pawl 70 and is coaxially pivotally mounted therewith on the bearing surface 77 of the pivot 72 through an aperture 95. Further, a rivet 92 inserted through an aperture 82 in the pawl 70 and an aperture 94 in the quadrant carrier plate 90 locks the quadrant carrier plate 90 and the pawl 70 for rotation together. The arcuate guide surface 96 is disposed along an arcuate upper edge of the quadrant carrier 90 and is adapted to support the quadrant 20 through camming engagement with the camming surface 55 of the lock plate 52.

The cam 100 is an oblong plate rotatably supported on a cam pivot 102, which is journalled in apertures 104, 106 in outboard and inboard plates 22, 24, respectively. The cam 100 includes a keyed aperture 114 through a first end thereof and a mounting aperture 128 through an opposite end thereof. The cam pivot 102 includes an intermediate keyed shoulder 108 flanked by a keyed end 116 and a slotted end 118. The keyed aperture 114 receives the keyed shoulder 108 of the cam pivot 102 for rotating the cam 100 when the cam pivot 102 is rotated by the seat-back latch release lever 110. The mounting aperture 128 mounts a cam pin 150, which extends generally transverse to the plate and interconnects the cam 100 to the fold-hold plate 140. An engaging surface 130 of the cam 100 is disposed within the generally tetrahedral-shaped notch of the pawl 70 for selective movement between engaging the cam surface 80 and the projection 86.

The keyed end 116 of the cam pivot 102 extends through the aperture 104 in outboard base plate 22 for reception in a keyed aperture 112 of the latch release lever 110, whereby rotation of the latch release lever rotates the cam pivot 102. The slotted end 118 of the cam pivot 102 opposite the keyed end 116 extends through the aperture 106 in inboard base plate 24 to secure an inner end 122 of a cam spring 120, which biases the cam pivot 102, and thus the cam 100 and the latch release lever 110, in a counterclockwise direction. An outer end 124 of the cam spring 120 is connected to the outer plate 22 at a tab 126 extending therefrom.

The fold-hold plate 140 is an elongated member having a contact surface 144 disposed at one end thereof for selectively engaging the lock surface 58 of the lock plate 52, whereby the fold-hold plate 140 is operable to block the seat back 8 from moving from the folded position to the upright position, as illustrated in FIG. 3. The fold-hold plate 140 is pivotally mounted coaxially with the cam 100 by receiving the cam pivot 102 through an aperture 142 disposed at the end opposite the contact surface 144. A guide surface 146 is disposed adjacent the contact surface 144 for sliding along the camming surface 55 of the lock plate 52 until the contact surface 144 engages the lock surface 58 of the lock plate 52. A cam slot 148, disposed between the guide surface 146 and the aperture 142, slidably receives an end of the cam pin 150 opposite the end secured to the cam 100. Upon rotation of the cam 100, the cam pin 150 slides in the slot 148 until it causes the fold-hold plate 140 to rotate therewith.

The interlock mechanism 14 is operable to control the sequence of latching operations of the seat-back latch mechanism 16 and the floor-latch mechanism 18. The interlock mechanism 14 includes the first lock-out lever 160 pivotally mounted on an exterior surface of the inboard base plate 24 via a latch lock-out pivot 162, a spring 172 for biasing the first lock-out lever 160 in a clockwise direction, and the second lock-out lever 180 interconnected to the cam latch 210.

The first lock-out lever 160 is a generally L-shaped member having an upper segment 164 and a lower segment 166 disposed generally perpendicular to one another. An aperture 168 for pivotally receiving the latch lock-out pivot 162 is generally disposed at the intersection of the upper and lower segments 164, 166. The pivot 162 is mounted in an aperture 158 through inboard base plate 24. The lower segment 166 is disposed adjacent the cam slot 170, blocks rotation of the second lock-out lever 180 in the cam slot 170 when the first lock-out lever 160 and the second lock-out lever 180 are in a first position (FIG. 1). The spring 172 is connected between the upper segment 164 and the inboard base plate 24, and includes opposite ends mounted to a tab 178 of the first lock-out lever 160 and in a slot 156 in the base plate 24. The spring 172 biases the first lock-out lever 160 in a clockwise direction to the second position (FIG. 3) wherein the cam slot 170 is not covered by the lower segment 166 and the lockout pin 196 is free to rotate therein. The upper segment 164 also includes a contact surface 174 selectively engaged by the lock-out pin 32 of the inboard support plate 28 when moving the first lock-out lever 160 from the second position to the first position.

The second lock-out lever 180 is a generally crescent-shaped plate pivotally mounted on a pivot 182 between the outboard and inboard base plates 22, 24. The pivot 182 is secured at its opposite ends in apertures 184, 186 in the outboard and inboard base plates 22, 24, respectively. A raised intermediate bearing surface 185 of the pivot 182 pivotably supports the second lock-out lever 180. The second lock-out lever 180 includes an upper segment 190 offset relative a lower segment 192, and an aperture 194 extends through the second lock-out lever 180 at the intersection of the upper and lower segments 190, 192 to receive the pivot 182. The upper segment 190 mounts the generally transversely extending lock-out pin 196, which slides in the cam slot 170 of the inboard base plate 22. The lower segment 192 includes a mounting aperture 188 for mounting a first end of a lock-out spring 200. The opposite end of the lock-out spring 200 is connected to the outer plate 22 via a rivet 204 secured in aperture 202 of the inboard base plate 24. At its end, the lower segment 192 also includes a generally transversely extending connecting pin 198, which is received by the cam latch 210.

The floor-latch mechanism 18 includes the cam latch 210 and a claw plate 250, which are selectively operable depending on the position of the first lock-out lever 160. The lock-out mechanism 18 is operable to selectively lock the seat base 6 to the base 4 through locking engagement of the claw plate 250 with a striker bar 262 secured to the base 4.

The cam latch 210 is a generally elongated body including a keyed aperture 212 at one end, a cam slot 214 at an opposite end, and a shoulder 213 therebetween. The keyed aperture 212 receives a first keyed end 228 of a cam pivot 218. The cam slot 214 slidably receives the connecting pin 198 of the second lock-out lever 180, which blocks rotation of the cam latch 210, and thus the floor-latch release lever 230, when the lock-out pin 196 of the second lock-out lever 180 is blocked by the first lock-out lever 160. When not blocked, counterclockwise rotation of the floor-latch release lever 230, and thus the cam latch 210, actuates the claw plate 250 through an interconnecting return spring 236. The shoulder 213 engages the claw plate 250 when the fold-latch mechanism 18 is in the use position.

The cam pivot 218 includes opposite ends journalled in apertures 222, 224 in the inboard and outboard base plates 24, 22, respectively. A second keyed end 226 of the cam pivot 218 extends through the aperture 224 of the outboard base plate 22 to mount the floor latch release lever 230. The floor-latch release lever 230 includes a keyed aperture 232 for receiving the second keyed end 226 of the cam pivot 218, and further includes apertures 234 for mounting an end of the return spring 236. The first keyed end 228 of the cam pivot 218 extends through the aperture 222 of the inboard plate 24 to coaxially mount an axle 238, which mounts a cam pivot (not shown), similar to the cam pivot 218, on the opposite side of the seat assembly 10 for actuating a second claw plate (not shown).

The claw plate 250 is a rotatable plate-like member having a hook portion 252 at a lower portion thereof, a notch 253 in a forward upper portion thereof, a pin 254 extending generally transversely from a rearward upper portion thereof, and an aperture 256 extending intermediately therethrough. The claw plate 250 rotates between a first position locked to the striker bar 262 and a second position unlocked from the striker bar 262. The pin 254 extends through a slot 260 formed in the outboard base plate 22, and mounts an end of the return spring 236, which extends between the pin 254 and the latch release lever 230. The pin 254 slides in the slot 260 as the claw plate 250 is disengaged from the striker bar 262 when the latch release lever 230 is rotated counterclockwise. The aperture 256 of the claw plate 250 receives a pivot 268 secured at its opposite ends in apertures 266, 264 in outboard and inboard base plates 22, 24, respectively. The notch 253 accommodates the shoulder 213 of the cam latch 210 when the floor-latch mechanism 18 is in the use position.

Figure 4:
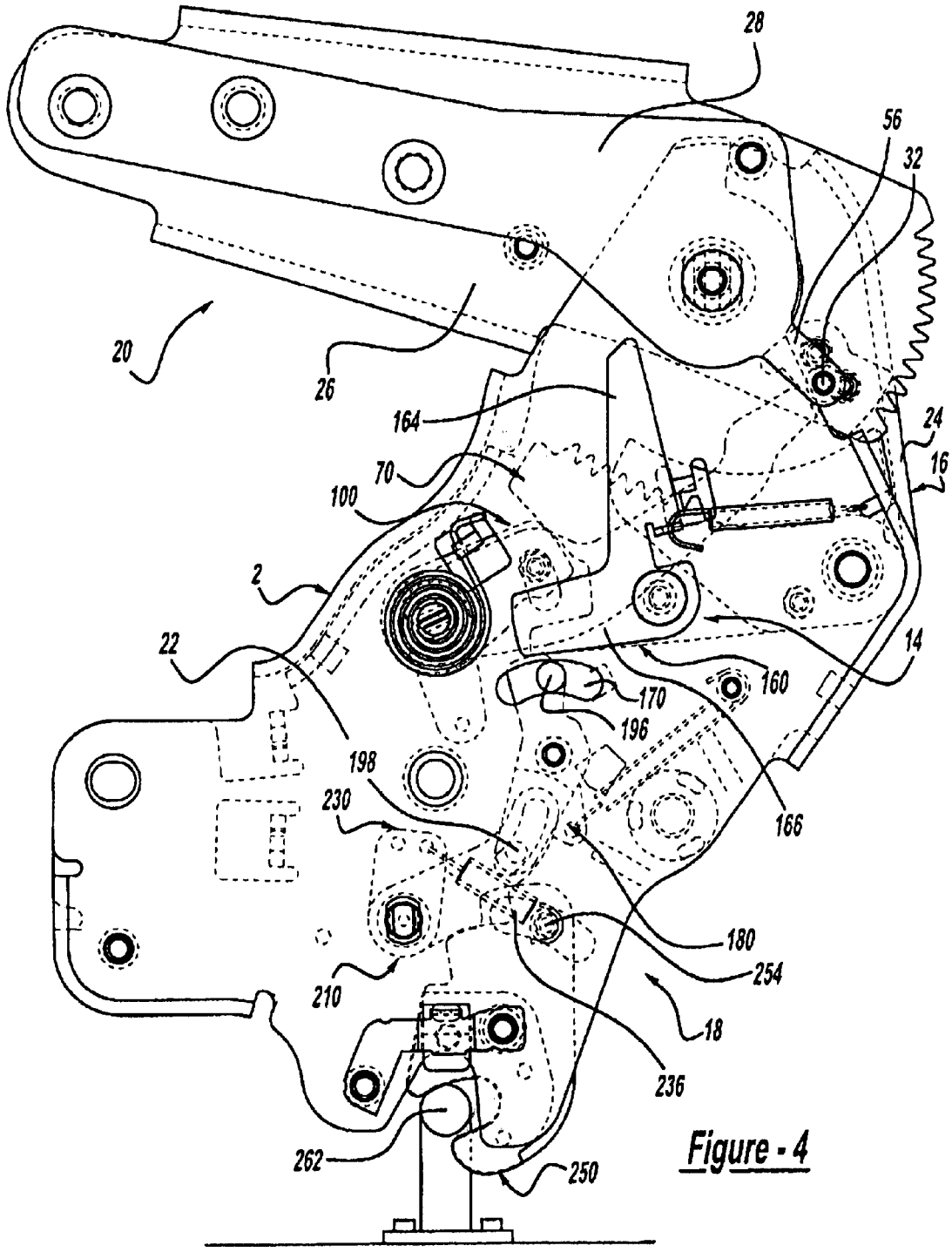
FIG. 4 is a side view of the latch system of FIG. 1 in position to dump the vehicle seat from the deployed to stowed position.

The return spring 236 biases the claw plate 250 in a counterclockwise direction, thereby facilitating disengagement of the claw plate 250 from the striker bar 262 when the latch release lever 230 is similarly rotated in a counterclockwise direction. In the first position, as shown in FIG. 3, because of the relative positions of the claw plate 250 and second lock-out lever 180, the return spring 236 maintains the claw plate 250 in the locked position as the shoulder 213 of the cam latch 210 nests in the notch 253 of the claw plate 250. In the second position, as shown in FIG. 4, the return spring 236 forces the claw plate 250 to the unlocked position because the claw plate 250 is free to rotate past the cam latch 210, which has been rotated out of the blocking position.

As shown in FIG. 1, the vehicle seat assembly 10 includes the latch assembly in the upright position, whereby the seat-back latch mechanism 16 and the floor-latch mechanism 18 are both in the locked position. More specifically, the seat-back latch mechanism 16 includes the cam 100 engaging the earn surface 80 of the pawl 70 to force the pawl teeth 78 into meshing engagement with the plate teeth 30 of the outboard support plate 26. Thus, the seat back 8 is not able to rotate relative the seat bottom 15. Further, the lock-out pin 196 of the second lock-out lever 180 is not able to slide in the cam slot 170 because the lower segment 166 of the first lock-out lever 160 is partially covering the cam slot 170 and blocking the lock-out pin 196. While the first lock-out lever 160 is biased in the clockwise direction to unblock the lock-out pin 196, the first lock-out lever 160 is itself blocked against such clockwise rotation by the lock-out pin 32 extending transversely from the projection 56 of the inner support plate 28. Thus, with the first lock-out lever 160 in this first position the floor-latch mechanism 18 is not operable.

By rotating the seat-back latch release lever 110 to rotate the cam pivot 102 and cam 100 against the bias of the spring 120, the cam 100 moves in the clockwise direction along cam surface 80 to engage the projection 86 and force the pawl teeth 78 of the pawl 70 out of engagement with the plate teeth 30 of the outer support plate 26, as shown in FIG. 2. This leaves the inner and outer support plates 26, 28, and thus the seat back 8, free to rotate, whereby the seat back 8 can be angularly adjusted relative the seat bottom 6. Further, as the seat back 8 is moved to its folded position, the lock-out pin 32 of the quadrant 20 no longer blocks the upper segment 164 of the first lock-out lever 160, as shown in FIG. 3. The first lock-out lever 160 rotates clockwise to the second position under the force of the spring 172 until the upper segment 164 is blocked by the stop 176 extending generally transversely from the inboard side of the outer plate 22. In the second position position, the lower segment 166 of the first lock-out lever 160 is removed from blocking the lock-out pin 196 of the second lock-out lever 180 in the cam slot 170. The second lock-out lever 180 is now free to rotate in a clockwise direction as the lock-out pin 196 slides in the cam slot 170.

With the seat back 8 in the folded position, and thus the first lock-out lever 160 in the second position, the floor-latch mechanism 18 is operable. As shown in FIGS. 3 and 4, rotation of the latch release lever 230 in a counterclockwise direction causes the cam pivot 218 to rotate the cam latch 210 in a counterclockwise direction out of block engagement of the claw plate 250 and causing the pin 198 extending generally transversely from the lower segment 192 of the second lock-out lever 180 to slide from an upper portion of the cam slot 214 to a lower portion thereof, whereby the lock-out pin 196 slides in a clockwise direction in the cam slot 170. If the first lock-out lever 160 was in the first position, as shown in FIG. 1, this clockwise rotation of the lock-out pin 196 would be blocked by the lower segment 166 of the first lock-out lever 160 through abutment with the lock-out pin 196. Through this counterclockwise motion of the latch release lever 230, the return spring 236 pulls the upper portion of the claw plate 250 in a counterclockwise direction until the hook portion 252 disengages from the striker bar 262, as shown in FIG. 4. The claw plate 250 remains in this unlocked position under the bias of the spring 236. Preferably, a claw plate 250 will be provided at opposite ends of the vehicle seat assembly and rotation of the latch release lever 230 at one end of the seat assembly 10 will rotate the claw plate 250 at both ends through the interconnecting axle 238. In this position, the seat bottom 6 is disengaged from the vehicle base 4 at its rear portion, whereby the seat bottom is able to pivot in a counterclockwise direction as shown in FIG. 5.

With the seat assembly 10 in the dumped position, the seat back 8 cannot be rotated to the upright or use position before the floor-latch mechanism 18 re-engages the striker bar 262 lo lock the seat assembly 10 to the vehicle base 4. This safety feature prevents a user from unintentionally using the seat with the seat assembly unlocked from the vehicle base 4. To prevent rotation of the seat back 8 to the upright position before re-engagement on the striker bar 262, the lock-out pin 196, in its second position, blocks rotation of the pawl 70, as illustrated best in FIG. 4. When the lock-out pin 196 is positioned intermediately in the cam slot 170, the pawl 70 is blocked against counterclockwise rotation. Thus, when the cam 100 is rotated clockwise by a user rotating the seat-back latch release lever 110, the pin 150 travels in the cam slot 148 of the fold-hold plate 140 but is blocked from disengaging the fold-hold plate 140 from the lock plate 52 because the clockwise rotation of the cam 100 is blocked by the pawl 70 when the cam 100 abuts the projection 86. In this manner, the fold-hold plate 140 cannot be disengaged from the lock plate 52 prior to resetting the claw plate 250 on the striker bar 262, at which point the lock-out pin 196 is moved in a counterclockwise direction in the cam slot 170 and out of blocking engagement with the pawl 70, whereby the seat back 8 is free to rotate to its upright or use position.

To return the seat bottom 6 to its deployed position, the seat bottom 6 is rotated in a clockwise direction from the position shown in FIG. 5 until the striker bar 262 engages surface 258 of the hook portion 252, causing the claw plate 250 to rotate clockwise, thereby locking the striker bar 262 within the hook portion 252 of the claw plate 250, as illustrated in FIG. 3. The return spring 236 maintains the claw plate 250 in the locked position with notch 213 of the cam latch 210 receiving the shoulder 253 of the claw plate and blocking further rotation of the claw plate 250 out of the locked position. Until the striker bar 262 is seated in the hook portion 252 of the claw plate 250, the seat back 8 cannot be rotated because the lock-out pin 196 blocks rotation of the pawl 70, which limits rotation of the cam 100 and blocks rotation of the fold-hold plate 140, which blocks rotation of the seat back 8 to its upright position through abutment with lock plate 52 of the quadrant 20. As explained above, the fold-hold plate 140 is held in the position blocking rotation of the seat back 8 because of the position of the lock-out pin 196 in the cam slot 170. But, with the striker bar 262 seated in the hook portion 252 of claw plate 250, the lock-out pin 196 is returned to its first position in the cam slot 170, whereby the pawl 70, cam 100, and fold-hold plate 140 are able to rotate and the seat back 8 is freely adjustable in its upright position.

More specifically, rotation of the claw plate 250 to its locked position about the striker bar 260 returns the latch release lever 230 to its first position through the interconnecting return spring 236. Clockwise rotation of the latch release lever 230 to its first position causes the cam latch 210 to similarly rotate clockwise, whereby the connecting pin 198 extending from the second lock-out lever 180 slides from the inner end to the outer end of the cam slot 214 in the cam latch 210. The sliding movement of the pin 198 forces the second lock-out lever 180 to rotate counterclockwise, whereby the lock-out pin 196 slides from its second position in the cam slot 170 to its first position. When the lock-out pin 196 is in the first position in the cam slot 170, the pawl 70, cam 100, and fold-hold plate 140 are free to rotate, and the seat back 8 is adjustable.

Once the seat assembly 10 is returned to its deployed position the seat back 8 can be returned to its upright position. The cam 100 is rotated clockwise from its position shown in FIG. 3 engaging the cam surface 80 of the pawl 70 to engagement with the projection 86 of the pawl 70, whereby the cam pin 150 of the cam 100 rotates from a top end of the slot 148 in the fold-hold plate 140 to a bottom end thereof. Upon reaching the bottom of the slot 148, the pin 150, through continued rotation of the cam 100, forces the fold-hold plate 140 to rotate clockwise. Slight clockwise rotation of the fold-hold plate 140 disengages the cam surface 146 of the fold-hold plate 140 from the lock surface 58 of the lock plate 52 fastened to the outboard support plate 26. Upon disengagement of the fold-hold plate 140 from the lock plate 52, the seat back 8 is rotated counterclockwise. During this counterclockwise rotation, the cam surface 55 of the lock plate 52 engages the arcuate top surface 96 of the quadrant carrier plate 90, forcing the quadrant carrier plate 90 to rotate in a counterclockwise direction about its pivot pin 72. Counterclockwise rotation of the quadrant carrier plate 90 forces similar counterclockwise rotation of the pawl 70 through their interconnection via the rivet 92 fastening them together. This places the pawl teeth 78 out of the travel path of the plate teeth 30 on the lower surface of the outboard support plate 26, whereby travel of the seat back 8 from its folded position to the upright position is uninhibited. Upon sufficient rotation, the lock pin 32 on the lower end of the inboard support plate 28 engages the upper segment 164 of the first lock-out lever 160. Because the pin 196 is in the first position in the cam slot 170 through locking engagement of the claw plate 250 on the striker bar 262, the first lock-out lever 160 is free to rotate counterclockwise to permit the seat back 8 to be moved to its fully upright position. Once the cam surface 55 of the lock plate 52 slides to the end of the arcuate surface 96 of the quadrant carrier plate 90, the pawl teeth 78 of the pawl 70 engage the plate teeth 30 of the outboard support plate 26, whereupon the seat back is locked in its upright position.

To adjust the angle of the seat back 8 relative the seat bottom 6, the user simply rotates the cam 100 in a clockwise direction by rotating the latch release lever 110 until the cam 100 strikes the projection 86, whereupon the pawl teeth 78 are disengaged from the plate teeth 30 and the seat back 8 can be angularly adjusted in its upright position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat assembly, comprising:

a seat bottom *rotatably* mounted to a base;

a seat back [adjustable relative] *rotatably mounted* to said seat bottom;

a seat-back latch mechanism interconnecting said seat back and said seat bottom [for movement] *and having latched and unlatched conditions, said seat-back latch mechanism in said unlatched condition permitting rotation* of said seat back between a use position and a folded position;

a floor-latch mechanism selectively connecting said seat bottom to said base [for movement] *and having latched and unlatched conditions, said floor-latch mechanism in said unlatched condition permitting rotation* of said seat bottom between a deployed position and a stowed position; and an interlock mechanism interacting with said floor-latch mechanism and said seat-back latch mechanism to selectively block operation of said floor-latch mechanism and said seat-back latch mechanism, wherein said interlock mechanism blocks operation of said floor-latch mechanism *from said latched to said unlatched condition* when said seat back is in said use position, and blocks operation of said seat-back latch mechanism when said [seatback] *seat bottom* is in said stowed position *and prevents substantial rotation of said seat back from said folded position when said floor-latch mechanism is in said unlatched condition to maintain said seat back in said folded position until said seat bottom is returned to said deployed position and said floor-latch mechanism is in said latched condition*.

2. The seat assembly according to claim 1 wherein said seat-back latch mechanism includes a pawl for adjusting said seat back relative to said seat bottom and for releasing said seat back for movement between said use position and said folded position.

3. The seat assembly according to claim 1 wherein said interlock mechanism includes a lock-out lever for blocking *operation of* said floor-latch [lock] mechanism *from said latched condition to said unlatched condition* when said seat back is in said use position.

4. The seat assembly according to claim 3 wherein said interlock mechanism includes a second lock-out lever for blocking *operation of* said seat-back latch mechanism when said seat bottom is in said stowed position.

5. The seat assembly according to claim 1 wherein said interlock mechanism includes a lock-out lever for blocking *operation of* said seat-back latch mechanism *from said unlatched condition to said latched condition* when said seat bottom is in said stowed position.

6. The seat assembly according to claim 5 wherein said interlock mechanism includes a second lock-out lever for blocking *operation of* said floor-latch lock mechanism when said seat back is in said use position.

7. A latch system for providing angular adjustment of a seat back relative to a seat bottom *and rotatable motion of the seat bottom relative to a base*, comprising:

a seat-back latch mechanism interconnecting said seat back and said seat bottom [for movement] *and having latched and unlatched conditions, said seat-back latch mechanism in said unlatched condition permitting rotation* of said seat back between a use position and a folded position;

a floor-latch mechanism selectively connecting said seat bottom to said base [for movement] *and having latched and unlatched conditions, said floor-latch mechanism in said unlatched condition permitting rotation* of said seat bottom between a deployed position and a stowed position; and an interlock mechanism interacting with said floor-latch mechanism and said seat-back latch mechanism to selectively block operation of said floor-latch mechanism and said seat-back latch mechanism, wherein said interlock mechanism blocks operation of said floor-latch mechanism *from said latched to said unlatched condition* when said seat back is in said use position, and blocks operation of said seat-back latch mechanism when said seat bottom is in said stowed position *and prevents substantial rotation of said seat back from said folded position when said floor-latch mechanism is in said unlatched condition to maintain said seat back in said folded position until said seat bottom is returned to said deployed position and said floor-latch mechanism is in said latched condition*.

8. The seat assembly according to claim 7 wherein said seat-back latch mechanism includes a pawl for adjusting said seat back relative to said seat bottom and for releasing said seat back for movement between said use position and said folded position.

9. The seat assembly according to claim 7 wherein said interlock mechanism includes a lock-out lever for blocking *operation of* said floor-latch [lock] mechanism *from said latched condition to said unlatched condition* when said seat back is in said use position.

10. The seat assembly according to claim 9 wherein said interlock mechanism includes a second lock-out lever for blocking *operation of* said seat-back latch mechanism when said seat bottom is in said stowed position.

11. The seat assembly according to claim 7 wherein said interlock mechanism includes a lock-out lever for blocking *operation of* said seat-back latch mechanism *from said unlatched condition to said latched condition* when said seat bottom is in said stowed position.

12. The seat assembly according to claim 11 wherein said interlock mechanism includes a second lock-out lever for blocking *operation of* said floor-latch [lock] mechanism when said seat back is in said use position.

13. A seat assembly, comprising:

a seat bottom pivotally mounted to a base at a front portion and releasably mounted to said base at a rear portion;

a seat back angularly adjustable relative to said seat bottom *between a use position and a folded position*;

a seat-back latch mechanism interconnecting said seat back and said seat bottom for pivotal movement of said seat back between [a] *said* use position and [a] *said* folded position;

a floor-latch mechanism *having latched and unlatched conditions for* releasably mounting said seat bottom to said base for pivotal movement between a deployed position and a stowed position; and an interlock mechanism interacting with said floor-latch mechanism and said seat-back latch mechanism, said interlock mechanism including a first lock-out lever [to] selectively [block] *blocking* operation of said floor-latch mechanism *until said seat back is substantially in said folded position* and a second lock-out lever [to] selectively [block] *blocking* operation of said seat-back latch mechanism when said seat back is in said folded position *and said floor-latch mechanism is in said unlatched condition*.

*14. The seat assembly of claim 13 wherein said second lock-out lever further blocks operation of said seat-back latch mechanism when said seat back is in said folded position and said seat bottom is in said stowed position.*

* * * * *

UNITED STATES PATENT AND TRADEMARK OFFICE

CERTIFICATE OF CORRECTION

PATENT NO. : RE41,964 E
APPLICATION NO. : 11/804408
DATED : November 30, 2010
INVENTOR(S) : Jacob Paul Hellrung et al.

It is certified that error appears in the above-identified patent and that said Letters Patent is hereby corrected as shown below:

Column 11,
Line 28, “lock” should be -- [lock] --.

Signed and Sealed this
Fifth Day of April, 2011

David J. Kappos

David J. Kappos
*Director of the United States Patent and Trademark Office*